Feb. 14, 1950        E. W. MOLLOY        2,497,823
RADIATION MEASURING DEVICE FOR AIR FILTERS
Filed June 10, 1946
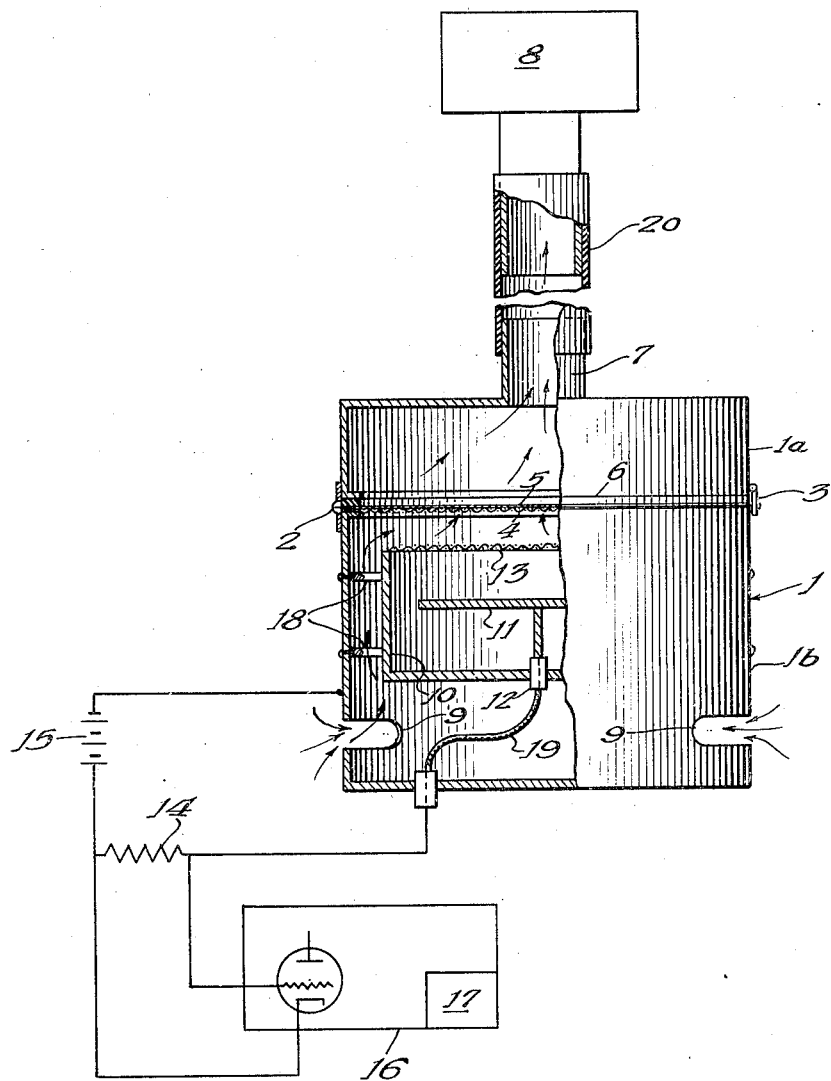
Inventor:
Everett W. Molloy
By: Robert A. Lavender
Attorney Patented Feb. 14, 1950

2,497,823

UNITED STATES PATENT OFFICE 2,497,823

RADIATION MEASURING DEVICE FOR AIR FILTERS

Everett W. Molloy, Pasadena, Calif., assignor to the United States of America as represented by the United States Atomic Energy Commission Application June 10, 1946, Serial No. 675,798

9 Claims. (Cl. 250—83.6)

My invention relates to a means and method for measuring the radioactivity of dust present in the atmosphere.

In laboratories and industrial establishments where radioactive materials are handled, a hazard arises to workers due to the inhalation of dust containing radioactive isotopes, some of which are extremely harmful when they emit their characteristic particles or rays within the human body. This is particularly true of certain isotopes which emit alpha particles. Alpha particle radiation received on the exterior of the body is of very little danger, since the effect in such a case is almost solely on the epidermis, or outer layer of skin, which is mainly composed of dead tissue and is therefore relatively insensitive. But if small amounts of the radioactive isotopes are inhaled, or otherwise enter the body, the radiation is able to affect comparatively sensitive internal portions of the body. In addition, in many cases the radiation will continue during the whole lifetime of the person, thus cumulating the damage.

One of the objects of my invention is to provide a means and method for measuring the concentration of radioactive isotopes in dust present in the atmosphere.

A further object of my invention is to provide a means and method of determining the amount of radioactive isotopes inhaled by persons from the atmosphere over given periods of time.

Further aims and objects of my invention will appear from description below.

Briefly states, in the illustrated embodiment of my invention, I have provided a means for drawing the air of the atmosphere through a filter paper upon which are deposited the dust particles therein contained, and an ionization chamber to measure the radioactivity of the dust thus collected.

For a more complete understanding of my invention, reference may be had to the following description, taken in connection with the accompanying drawing, in which the single figure is a front elevation, with a portion broken away and shown in section, combined with a schematic circuit diagram illustrating my invention.

Referring now to the drawing, metallic outer casing 1 is composed of a top portion 1a and a bottom portion 1b, each provided with a cup-shaped cavity. The top and bottom portions 1a and 1b, respectively, are secured together by a hinge 2 and a clasp 3. Covering the open side of bottom portion 1b is a coarse wire mesh screen 4, upon which is placed a sheet of filter paper 5, adapted to collect dust. Filter paper 5 completely covers the wire mesh screen 4 and is held securely in place by a rubber gasket 6, the rubber gasket 6 and the outer edge of the filter paper 5 being clamped between the top 1a and bottom 1b portions of the outer casing. The top 1a is provided with an air outlet 7 through which air is drawn by means of a vacuum pump 8 and a flexible hose 20.

The bottom portion 1b is provided with a plurality of openings 9. Mounted within the bottom portion 1b, and coaxially therewith, by metal posts 18, is an ionization chamber consisting of a closed cylindrical outer electrode 10 and a collecting plate electrode 11 electrically insulated from the outer electrode 10 by an insulator 12. Across the top of the cylindrical outer electrode 10, adjacent to the wire mesh screen 4 and the filter paper 5, is a coarse wire mesh screen 13, which completes the outer electrode 10 of the ionization chamber. The collecting plate electrode 11 is connected by an insulated wire 19 to one terminal of a resistor 14, and other terminal of resistor 14 being connected to the positive terminal of a voltage supply 15. The negative terminal of the voltage supply is connected to the outer case 1 and thus to the outer cylindrical electrode 10 by means of the metal supporting posts 18.

When the vacuum pump 8 is in operation, air is drawn into the cavity of the bottom portion 1b of the outer casing through openings 9. It flows, as indicated by arrows, through the filter paper 5 into the cavity of the top portion 1a of the outer case and thence out through the air outlet 7. The filter paper 5 collects the dust contained in the air thus sampled. The voltage appearing across the resistor 14 as a result of ionization occurring in the ionization chamber consisting of electrodes 10 and 11 is a measure of the amount of radioactive material present on the filter paper 5. This voltage is measured by the electrometer circuit 16. Many circuits for this purpose are well-known in the art and in common use for measurement of radioactivity in connection with ionization chambers. I have therefore not shown in the drawing the particular circuit used by me.

The filter paper 5 may be replaced by opening the outer casing 1 by unlocking clasp 3 and swinging the upper portion 1a about hinge 2.

In one application of my invention, I have drawn air through the system by means of vacuum pump 8 at a rate of known ratio to the average rate at which persons inhale air in breathing, thus constituting the measure of radioactivity of the collected dust a measure of the amount of radioactive material inhaled by a person working in the same atmosphere during the period of operation. In such application I have provided an alarm 17 to warn such persons that since the commencement of operation of the device he has inhaled a predetermined amount of radioactive material. Such alarms are well-known in the art.

The scope of my invention is not intended to be limited by the apparatus described and illustrated in the drawing. Many equivalent ways of employing the method I have disclosed and constructing the apparatus I have disclosed will be readily apparent to one skilled in the art.

I claim:

1. Apparatus of the class described comprising, in combination, a filter paper adapted to collect the dust from air, means for flowing the air through said filter paper at a constant rate, and radioactivity measuring means adjacent to and spaced from the air input side of said filter paper adapted to measure the radioactivity of the dust thereon collected.

2. Apparatus of the class described comprising, in combination, a conduit having a portion open to the atmosphere, a porous filter within the conduit adapted to collect atmospheric dust, a flow impeller coupled to the conduit to direct a sample of atmospheric air therethrough and through the filter at a constant rate, and a radioactivity measuring instrument adjacent the filter on the air input side thereof to measure the radioactivity of the dust collected thereby.

3. Apparatus for measuring the amount of radioactive material inhaled from the surrounding atmosphere by a human being or animal over a period of time comprising, in combination, a gas flow chamber having an inlet passage communicating with the surrounding atmosphere, a horizontal wire mesh screen adapted to support a filter paper in said chamber, a hinged lid on said chamber above said screen, an air outlet passage in said lid, means for impelling air through said chamber and said screen, and an ionization chamber in said flow chamber below and adjacent to said screen.

4. In combination, the apparatus of claim 3 and a filter paper resting upon said mesh screen.

5. Apparatus of the class described comprising, in combination, a gas flow chamber having an inlet passage communicating with the surrounding atmosphere, a wire mesh screen adapted to support a filter paper in said chamber, said chamber having a removable portion adjacent to said screen, an air outlet passage in said removable portion, means for impelling air through said chamber and said screen, and radiation measuring means in said chamber adjacent to said screen on the air inlet side thereof.

6. Apparatus of the class described comprising, in combination, a gas flow chamber having an inlet passage communicating with the surrounding atmosphere, a porous filter mounted transversely of the chamber, means for impelling air through said chamber and said filter, and radiation measuring means within said chamber adjacent to said filter on the air inlet side thereof.

7. Apparatus of the class described comprising, in combination, a gas flow chamber having an inlet passage communicating with the surrounding atmosphere, a filter paper mounted transversely of the chamber, means for impelling air through said chamber and said filter paper, and radiation measuring means within said chamber adjacent to said filter paper on the air inlet side thereof.

8. Apparatus of the class described comprising, in combination a gas flow chamber having an inlet passage communicating with the surrounding atmosphere, means for mounting a porous filter transversely of the chamber, means for impelling air through said chamber, and radiation measuring means within said chamber adjacent to said filter mounting means on the air inlet side thereof.

9. Apparatus of the class described comprising, in combination, a porous filter, means for impelling air through said filter, and radiation measuring means adjacent to said filter on the air inlet side thereof.

EVERETT W. MOLLOY.

REFERENCES CITED

The following references are of record in the file of this patent:

UNITED STATES PATENTS

| Number | Name | Date |
|---|---|---|
| 984,047 | Touzalin | Feb. 14, 1911 |
| 2,368,486 | Mullane | Jan. 30, 1945 |